US009146991B2

(12) United States Patent
Valdes et al.

(10) Patent No.: US 9,146,991 B2
(45) Date of Patent: Sep. 29, 2015

(54) APPARATUS AND METHOD FOR USER CONFIGURABLE CONTENT INTERFACE AND CONTINUOUSLY PLAYING PLAYER

(75) Inventors: Israel Valdes, Fort Lauderdale, FL (US); Philip Wong, Miami, FL (US); Jason Chaney, Cornelius, NC (US)

(73) Assignee: The Rocbox Network Corporation, Fort Lauderdale, FL (US)

( * ) Notice: Subject to any disclaimer, the term of this patent is extended or adjusted under 35 U.S.C. 154(b) by 522 days.

(21) Appl. No.: 12/123,978

(22) Filed: May 20, 2008

(65) Prior Publication Data

US 2008/0295022 A1 Nov. 27, 2008

Related U.S. Application Data

(60) Provisional application No. 60/939,601, filed on May 22, 2007.

(51) Int. Cl.
*G06F 3/048* (2013.01)
*G06F 17/30* (2006.01)

(52) U.S. Cl.
CPC .... *G06F 17/30849* (2013.01); *G06F 17/30893* (2013.01); *G06F 3/048* (2013.01)

(58) Field of Classification Search
CPC .............. G06F 3/048; G06F 17/30893; G06F 17/30849
USPC .................................................. 715/781, 769
See application file for complete search history.

(56) References Cited

U.S. PATENT DOCUMENTS

| | | | |
|---|---|---|---|
| 2001/0054181 A1 | 12/2001 | Corvin | |
| 2002/0120939 A1* | 8/2002 | Wall et al. | 725/87 |
| 2002/0140719 A1 | 10/2002 | Amir et al. | |
| 2003/0140159 A1 | 7/2003 | Campbell et al. | |
| 2003/0163372 A1 | 8/2003 | Kolsy | |
| 2005/0050218 A1 | 3/2005 | Sheldon | |
| 2006/0277457 A1 | 12/2006 | Salkind et al. | |
| 2007/0038931 A1 | 2/2007 | Allaire et al. | |
| 2007/0079240 A1* | 4/2007 | Zhang | 715/716 |
| 2007/0107019 A1 | 5/2007 | Romano et al. | |
| 2007/0136418 A1 | 6/2007 | Wolfe | |
| 2007/0143493 A1* | 6/2007 | Mullig et al. | 709/232 |
| 2007/0226432 A1 | 9/2007 | Rix | |
| 2007/0299981 A1* | 12/2007 | Baird | 709/231 |
| 2008/0031447 A1 | 2/2008 | Geshwind et al. | |

* cited by examiner

*Primary Examiner* — Andrea Leggett
(74) *Attorney, Agent, or Firm* — Greenberg Traurig, LLP

(57) ABSTRACT

Disclosed is a web browser based content management application with an integrated user configurable content interface whereby a user can manage a wide variety of content using a single window. The user interface includes a "browser window in a browser window" that provides transparent access to a host of underlying applications that are configured to manage the user's interaction with a wide variety of content, including multimedia content delivered via the Internet. The windowing functionality of the content management application can be set to automatically reconfigure based on the number and type of content accessed. A continuously playing video player is configured to appear within a web page when a user browses to the first web page and to render video overlayed on the web page. The player is configured to play the same video stream continuously while a user browses from the web page to a second web page.

26 Claims, 5 Drawing Sheets

APPARATUS AND METHOD FOR USER CONFIGURABLE CONTENT INTERFACE AND CONTINUOUSLY PLAYING PLAYER

This is a non-provisional patent application claiming priority to U.S. Provisional Patent Application No. 60/939,601 filed May 22, 2007, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates generally to content management and more specifically relates to a novel approach for a user-configurable content interface for accessing various types of content such as multimedia content delivered via the Internet.

BACKGROUND OF THE INVENTION

The popularization of the Internet as a content delivery system in recent years has enabled any properly configured computer to extract various types of information from one or more servers, and to provide the extracted information to users all over the world easily and quickly. As the popularity of the Internet has grown, so has the type of information available via the Internet. For example, it is now possible to download, retrieve, and use streaming audio and video files as well as standard text, graphics and data files. Multimedia files are readily available for retrieval and use by Internet users. With the increasing popularity of complex content and multimedia files, users are now routinely accessing a large quantity of information in a wide variety of formats.

Some of the most popular Internet content applications of the present time include the following non-exhaustive categories: instant messaging; audio and video chat; recorded and live video feeds (i.e., television, movies, music videos, video podcasts, etc.), recorded and live audio feeds (i.e., audio podcasts, music, etc.) and other graphic files (still photos, graphics, etc.).

As explained above, there are numerous opportunities for users to access a wide variety of content, including multimedia content, via the Internet. Unfortunately, each of these different categories of content may be offered by a number of disparate companies, each with their own unique and sometimes proprietary approach to delivering the content over the Internet to the user. It is not uncommon for each new application to present the user with a completely different interface for interacting with the application. This means that the typical user must generally learn and become proficient with multiple mutually exclusive user interfaces. This learning curve can be intimidating to certain users who, rather than make the investment in mastering yet another user interface will simply "opt out" and choose to forgo accessing certain categories of content from certain sources. While this solution is practical for the user, it can limit the user's access to otherwise desirable media.

In addition to the numerous interfaces that must be learned, the sheer volume and diversity of content available and the physical logistics of managing the presentation of the content to a user can also be quite daunting. For example, if a user is watching a streaming video file on their computer monitor and simultaneously chatting with another user via an instant messaging application, the coordination of the content can be problematic or even incompatible. The issues related to "focus" for the competing content delivery applications can be overwhelming for the typical Internet browser. For example, the streaming video window may displace the chat window, or vice versa, temporarily or permanently terminating one of the content delivery applications. This may cause the user to switch back and forth between the applications, restart one or more applications and miss some portion of the chat and/or the streaming video.

This problem is only intensified for more sophisticated users who routinely access three, four, or even more sources of content simultaneously since each form of content is typically managed by a separate application in a separate window displayed on the user's computer monitor. The actual uploading and downloading of the content can also be technically challenging for many users since the wide variety of media types and lack of standardized interfaces are not always intuitive.

Another area of concern is the temporal and spatial management of the various types of content commonly accessed by users today. This relates to compatibility issues that may arise when using multiple applications to access and manipulate different forms of content at the same time. Not only is the screen real estate for the typical computer user limited in a physical sense, the practice of simultaneously accessing multiple applications can introduce a mental or psychological limitation as well. Although many users are fairly sophisticated and can "multi-task" with different content applications, there are practical limits that are exacerbated by the lack of standardized user interfaces. This is exhibited when a user constantly has to resize and reposition multiple windows in order to access multiple content applications.

As shown by the discussion above, although the present applications and application interfaces for accessing content via the Internet are not without merit, the diverse nature and nonstandard approach provided by multiple disparate vendors is sometimes challenging and, accordingly, certain users may have a difficult time accessing, managing, and utilizing the desired content as desired. Therefore, without improvements in the nature of the application and user interface for simultaneously working with multiple, disparate applications to access, manage, and utilize diverse forms of content, the user experience will continue to be sub-optimal.

SUMMARY OF THE INVENTION

The apparatus and methods of the present invention in one embodiment provide a web browser based content management application with an integrated user-configurable content interface whereby a user can manage a wide variety of content, including multimedia content, using a single window. The user interface comprises a "browser window in a browser window" that provides transparent access to a host of underlying applications that are configured to manage the user's interaction with a wide variety of content, including multimedia content delivered via the Internet. By consolidating all of the interaction with the content into a single application, the user can more easily control the interaction and configure the interface for optimal use. Additionally, the windowing functionality of the content management application can be set to automatically reconfigure based on the number and type of content being accessed.

According to an embodiment, a method of distributing multimedia content via an integrated user configurable content interface includes transmitting a plurality of multimedia content via a network, rendering the plurality of multimedia content within a plurality of corresponding content windows, and deploying the plurality of content windows within a content management application. The content management application may provide for an user interface that allows a user to manage the plurality of content windows and access the plurality of multimedia content. In some embodiments, at least two of the plurality of multimedia content may operate simultaneously.

According to another embodiment, the method described above may further include the steps of instantiating a new content window in response to an user request of multimedia content and configuring the new content window and the plurality of content windows. The configuration is automatically performed based upon user preferences, the total number of content windows, and the type of content requested.

According to still another embodiment, the method may also include the repositioning of at least one of the plurality of content windows in response to an user request and the reconfiguring of the plurality of content windows. Again, the configuration is automatically performed based upon user preferences, the total number of content windows, and the type of content requested.

In some embodiments, the network is an internet network. Certain embodiments of the invention involve a plurality of content windows that are browser windows and a content management application that is a main browser window. Accordingly, the user interface comprises of at least one content browser window within the main browser window. Various embodiments may also require that the user interface provides for a means of controlling the functionality of the content browser windows, as discussed later in detail.

Still other embodiments allow at least one of the content browser windows to be a video player. The video player maintains video playback while the user simultaneously interfaces with at least one other content browser window within the main browser window. For some embodiments, the method includes uploading a video via the network upon the user dragging and dropping a thumbnail of the corresponding video into a playlist for the video player, and making the video available for viewing in the video player. A few embodiments provide for the linking of the user to the uploaded video. The method may further include the step of creating a profile of the user where the profile includes links to multimedia content previously uploaded by the user.

According to another embodiment, a system for distributing multimedia content via an integrated user configurable content interface may include a plurality of multimedia content transmitted via a network, a user interface accessible to the network that renders the plurality of multimedia content within a plurality of corresponding content windows, and a content management application that deploys the plurality of content windows. The user interface renders the plurality of content windows within the content management application to provide for a browser in browser configuration that allows a user to manage the plurality of content windows and access the plurality of multimedia content. In some embodiments, at least two of the plurality of multimedia content may operate simultaneously.

According to another embodiment, the system described above may further include a new content window instantiated in response to an user request of multimedia content. The content management application may configure the new content window and the plurality of content windows. Also, the configuration is automatically performed based upon user preferences, the total number of content windows, and the type of content requested.

In another embodiment, at least one of the plurality of content windows is repositioned in response to an user request. Again, the content management application may configure the plurality of content windows, and the configuration is automatically performed based upon user preferences, the total number of content windows, and the type of content requested.

In some embodiments, the network is an internet network. Certain embodiments involve a plurality of content windows that are browser windows and a content management application that is a main browser window. Accordingly, the user interface comprises of at least one content browser window within the main browser window. Various embodiments may also require that the user interface provides for a means of controlling the functionality of the content browser windows, as discussed later in detail.

Still other embodiments may allow at least one of the content browser windows to be a video player. The video player maintains video playback while the user simultaneously interfaces with at least one other content browser window within the main browser window. For some embodiments, the system includes a video uploaded via the network upon the user dragging and dropping a thumbnail of the corresponding video into a playlist for the video player. The content management application makes the video available for viewing in the video player. A few embodiments provide for a profile of the user that is linked to the uploaded video. The system may further provide that the profile includes links to multimedia content previously uploaded by the user.

In yet another embodiment, a continuously playing video player is configured to appear within a first web page when a user browses to the first web page and to render video overlayed on the first web page. The player is configured to play the same video stream continuously while a user browses from the first web page to a second web page.

BRIEF DESCRIPTION OF THE DRAWINGS

The preferred embodiments will hereinafter be described in conjunction with the appended drawings wherein like designations denote like elements and.

DETAILED DESCRIPTION OF THE PREFERRED EMBODIMENT

In one embodiment, a web browser based content management application is combined with an integrated user configurable content interface whereby a user can manage a wide variety of content, including multimedia content, using a single window. The user interface comprises a "browser window in a browser window" that provides transparent access to a host of underlying applications that are configured to manage the user's interaction with a wide variety of content, including multimedia content delivered via the Internet. By consolidating all of the interaction with the content into a single application, the user can more easily control the interaction and configure the interface for optimal use. Additionally, the windowing functionality of the content management application can be set to automatically reconfigure based on the number and type of content being accessed.

Figure 1:
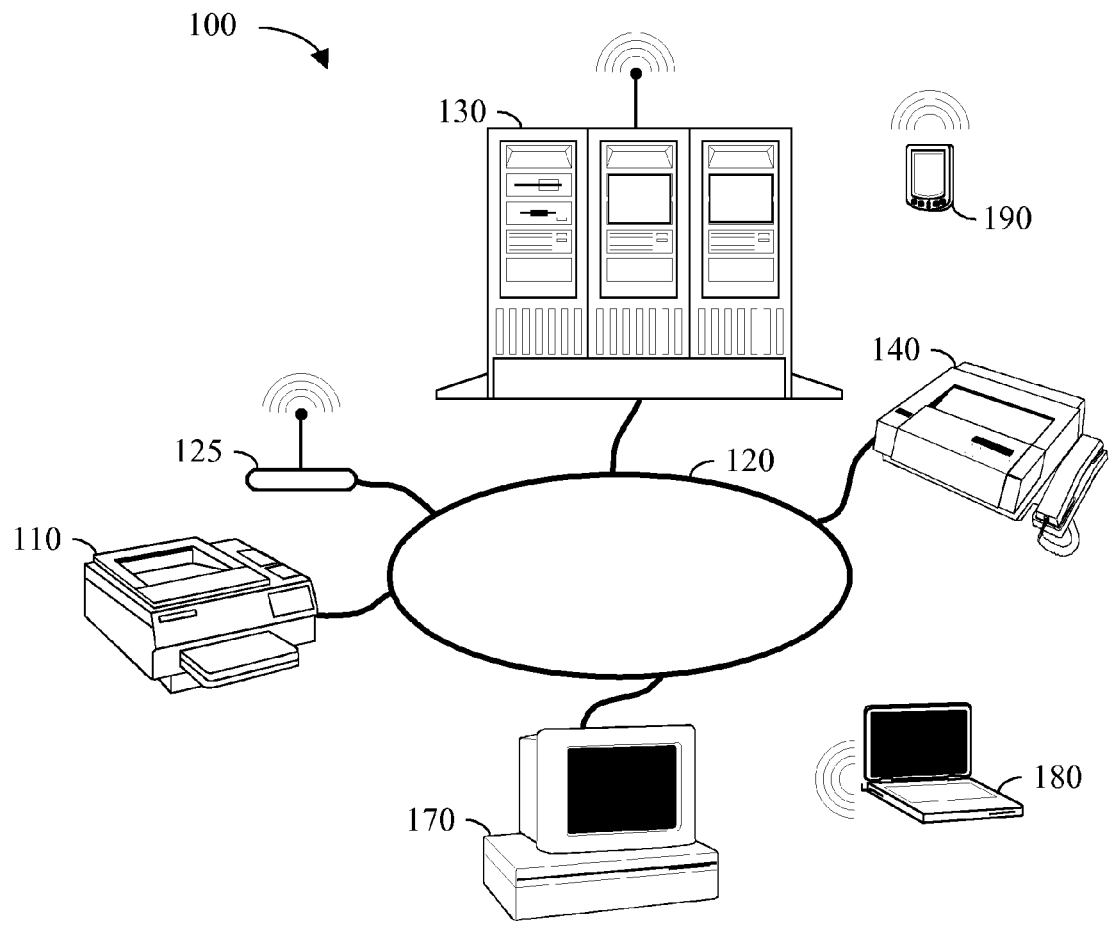
FIG. 1 is a block diagram of a computer-based system for implementing a user configurable content interface for accessing various forms of content via the Internet.

Referring now to FIG. 1, a computer-based system 100 for implementing a user-configurable content interface for accessing, manipulating, and managing various forms of content via the Internet in accordance with one exemplary embodiment comprises: a data server 130; a computer 170; a laptop computer 180, a personal digital assistant (PDA) 190, wireless communication device 125; all communicatively connected or coupled via a network 120. Additionally, an optional printer 110, and an optional fax machine 140 are shown.

Taken together, the components of computer-based system 100 provide a way for a disparate user base to access one or more components or subsystems of computer-based system 100. While the embodiments set forth herein will be described in detail by using the example of accessing various forms of media and content in the context of the Internet, those skilled in the art will recognize that the methods and techniques described herein have broad applicability to other environments and applications where the use of a user configurable content interface for accessing, manipulating and managing media and content is desirable.

Content application 226 is a software application or mechanism that is configured to interact with users of computer-based system 100 of FIG. 1. By utilizing content application 226, a user can access and interface with various types of content, including content stored or referenced in conjunction with database 223. In various embodiments, content application 226 provides a software mechanism for interacting with a web-browser interface for a web-based application delivered to a user's web browser via web server 222.

Figure 3:
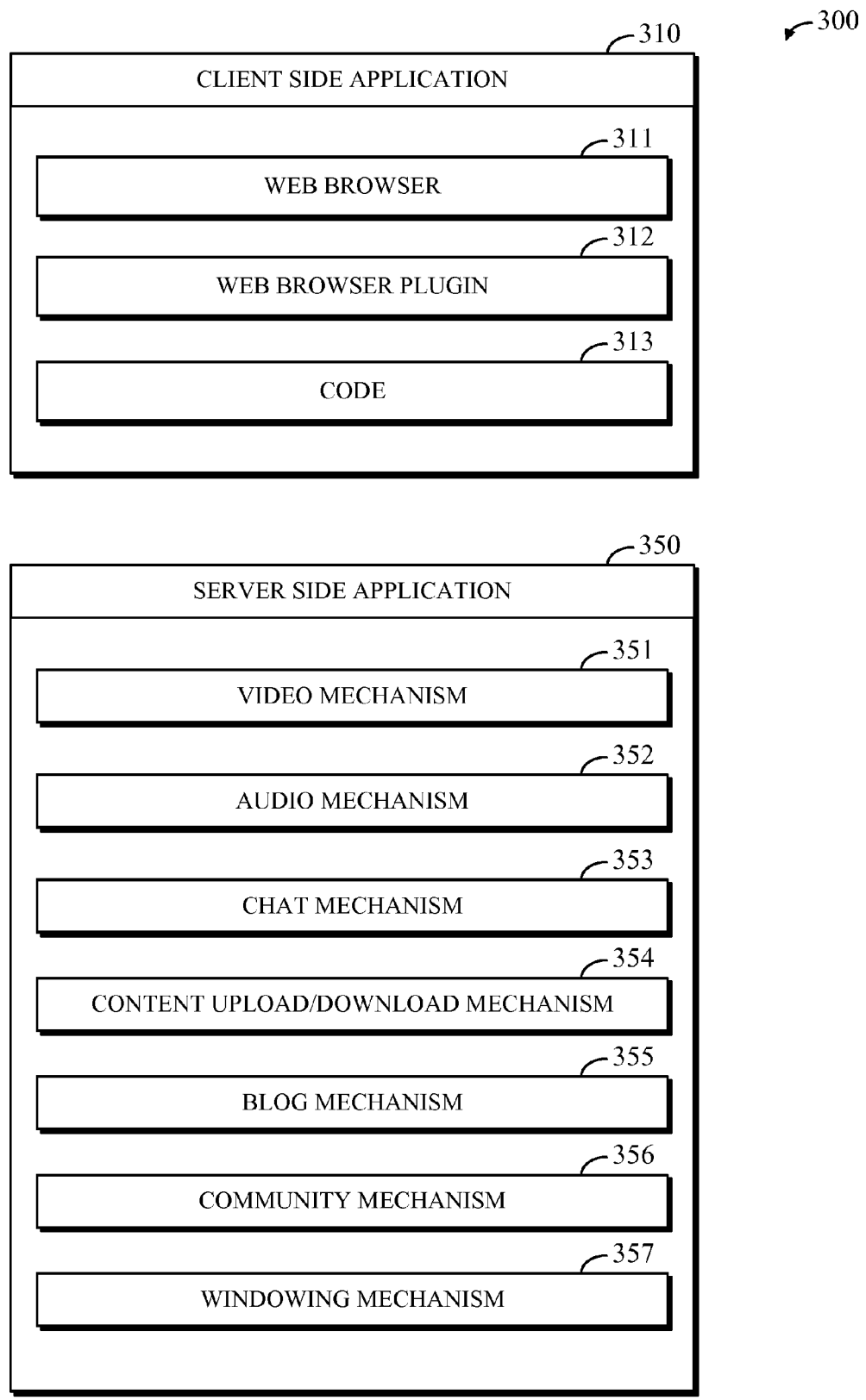
FIG. 3 is a block diagram for the client side application and the server side application used for implementing a user configurable content interface for accessing various forms of content via the Internet in accordance with one exemplary embodiment of the present invention.

Referring now to FIG. 3, a block diagram 300 for a Client Side Application 310 and a Server Side Application 350 used for implementing a user configurable content interface for accessing various forms of content via the Internet in accordance with an exemplary embodiment is depicted. Those skilled in the art will recognize that there are a number of combinations of Client Side Applications 310 and Server Side Applications 350 that may be configured to implement the methods disclosed herein.

Client Side Application 310 may comprise a typical web browser application 311 such as Microsoft Internet Explorer, Apple Firefox, Netscape Navigator, Mozilla Firefox, etc. Those skilled in the art will recognize that there are many different web browsers that may be deployed to accomplish the objects of the present invention. Additionally, in at least one embodiment, one or more web browser plug-in 312 and/or Code 313 may be configured for use with web browser application 311. Client Side Application 310 is configured to communicate with Server Side Application 350 via network 120 of FIG. 1. In the most embodiments, web browser plug-in 312 and/or Code 313 may be configured to implement the functionality of the various mechanisms of Server Side Application 350.

Web browser plug-in 312 is representative of the class of programmatic or software applications that are used to extend or expand the functionality of web browser 311. Examples of applications that may be deployed as a web browser plug-in 312 includes PDF viewers, Flash viewers, etc. In the most embodiments, web browser plug-in 312 is a content plug-in used to enable web browser 311 to accurately display and/or manage one or more types or classes of content.

Code 313 is representative of the class of programmatic or software applications that are used to extend or expand the functionality of web browser 311. These types of applications may be JAVA applets, Active X components, scripts, etc. In most embodiments, Code 313 will be a special purpose application used to enable web browser 311 to accurately display and/or manage one or more types or classes of content. In at least one embodiment, Code 313 is incorporated into Server Side Application 350.

Server side application 350 represents a software application used to interact with web browser 311 in order to implement one or more user configurable content interfaces for accessing various forms of content via the Internet. As shown in FIG. 3, Server Side Application 350 comprises one or more of the following components—Video Mechanism 351, Audio Mechanism 352, Chat Mechanism 353, Content Upload/Download Mechanism 354, Blog Mechanism 355, Community Mechanism 356, and Windowing Mechanism 357. Each of the components of Server Side Application 350 may be invoked by the user of web browser 311, and each component will be displayed in a separate window within the main browser window of web browser 311.

Video Mechanism 351 is representative of a video player component that is configured to play video clips, streaming video, etc. in a window of web browser 311. Video Mechanism 351, in conjunction with Windowing Mechanism 357, may be configured to display a video feed in a window with the main browser window of web browser 311. Unlike conventional video players known to those skilled in the art, Video Mechanism 351 is configured to continuously play the selected video content in the window, regardless of any other content related activities that may be occurring simultaneously. This is in contrast to prior web browser based video players that pause video playback or are completely terminated when the user navigates to another web page or content display window.

Additionally, the size of the location of the window that is created and used in conjunction with Video Mechanism 351 may be constantly adjusted, based on the number of other content windows that have been selected by the user. Certain embodiments may also deploy a Video Mechanism 351 that enables "drag and drop" functionality for video playlists. In these embodiments, a user may simply drag a thumbnail image representing a video clip or other video content onto a designated portion of the window displaying Video Mechanism 351 to create a video playlist. Then, whenever the user desires, the video playlist can be activated and the video content represented by the thumbnails will be displayed in the window for Video Mechanism 351 that allows the video content to be automatically loaded for playback.

Audio Mechanism 352 is representative of an audio player component that is configured to play audio clips, streaming audio, MP3 files, etc. in a window of web browser 311.

Chat Mechanism 353 is representative of a component that is configured to enable the user of web browser 311 to transmit short messages, including text messages, emoticons, pictures, hyperlinks, pictures, etc. to other users that may also have access to system 100 of FIG. 1. Chat Mechanism 353 is configured to receive and interpret chat messages from a wide variety of standard chat clients including AOL Messenger, Yahoo Messenger, Microsoft Messenger and the like. Chat Mechanism 353 provides interoperability between these various disparate chat clients, thereby enabling the user of web browser 311 to communicate with other users of system 100.

Content Upload/Download Mechanism 354 is representative of one or more software mechanisms that can be accessed by the user of web browser 311 to upload and/or download content from and to various locations via network 120 of FIG. 1 for use in conjunction with the embodiments disclosed herein.

Blog Mechanism 355 is representative of a software mechanism that will allow the user of web browser 311 to create, read, and post comments in a standard weblog, all displayed and contained in a window of web browser 311.

Community Mechanism 356 is representative of social networking functions, bulletin boards, message centers, etc. that can all be accessed in a window of web browser 311. Each user of Client Side Application 310 may be required to complete a user profile that contains one or more data elements that can be used to identify the user. The user profiles will be managed and tracked by Content Application 226 of FIG. 2. In this fashion, it will always be possible to tell which user is accessing Database 223 of FIG. 2.

Figure 2:
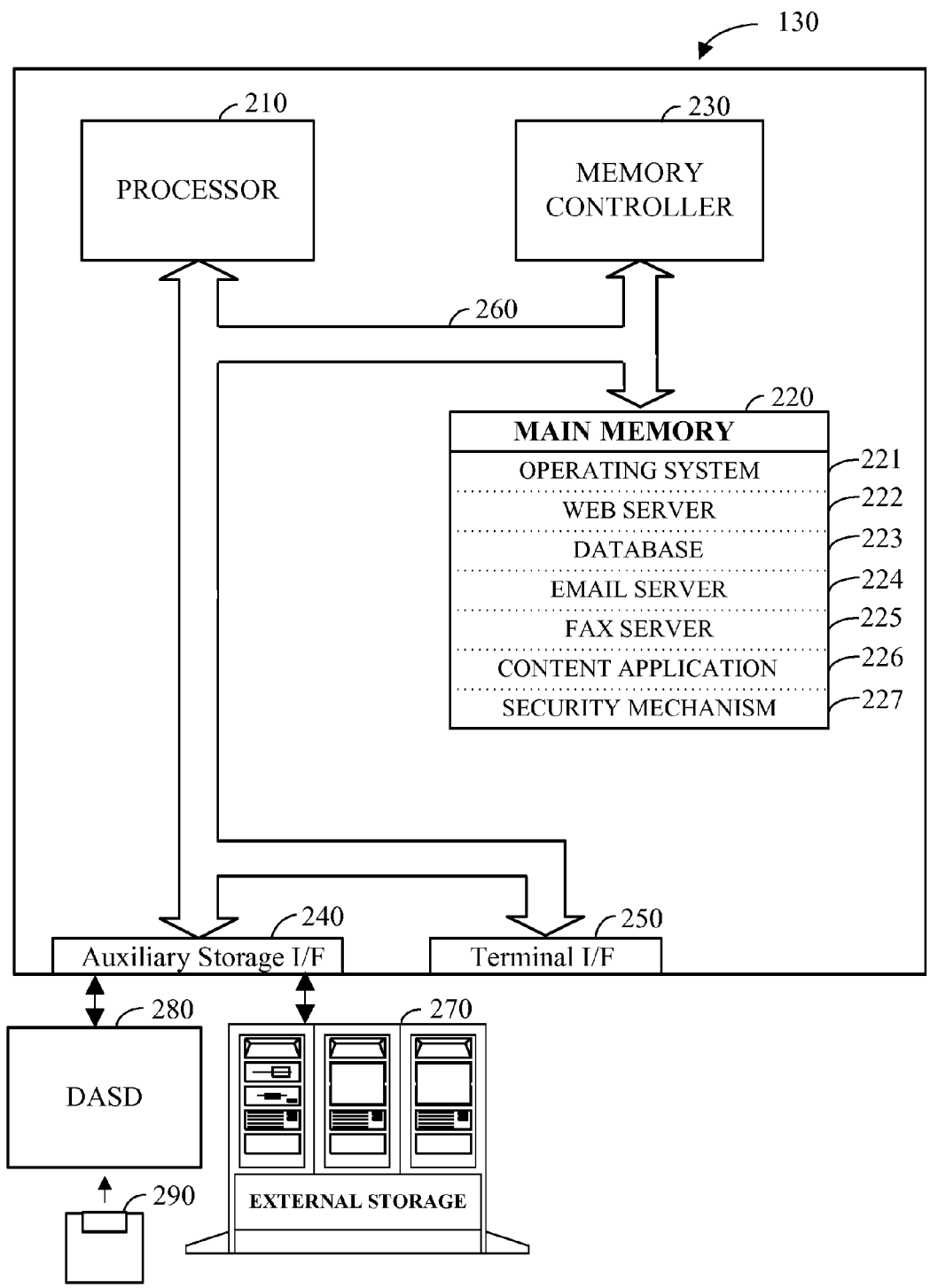
FIG. 2 is a block diagram of a web-based application for implementing a user configurable content interface for accessing various forms of content via the Internet.

Windowing Mechanism 357 is a software mechanism that is configured to manage the multiple windows presented to web browser 311 by web server 222 of FIG. 2. Windowing Mechanism 357 provides a means for controlling the functionality of the various windows as the windows are instantiated and repositioned by the user of web browser 311. Windowing Mechanism 357 is programmatically configured to manage the position of the windows for each component of Sever Side Application 350 and will automatically resize the various windows based on user preferences as well as other factors such as which components have been invoked by the user and the total number of windows opened by the user.

Those skilled in the art will recognize that the various components depicted in FIG. 1, FIG. 2, and FIG. 3 are all configured to work in concert, thereby providing a user with a user-configurable content interface for storing, accessing, and otherwise managing various types of media and content via the Internet.

Figure 4:
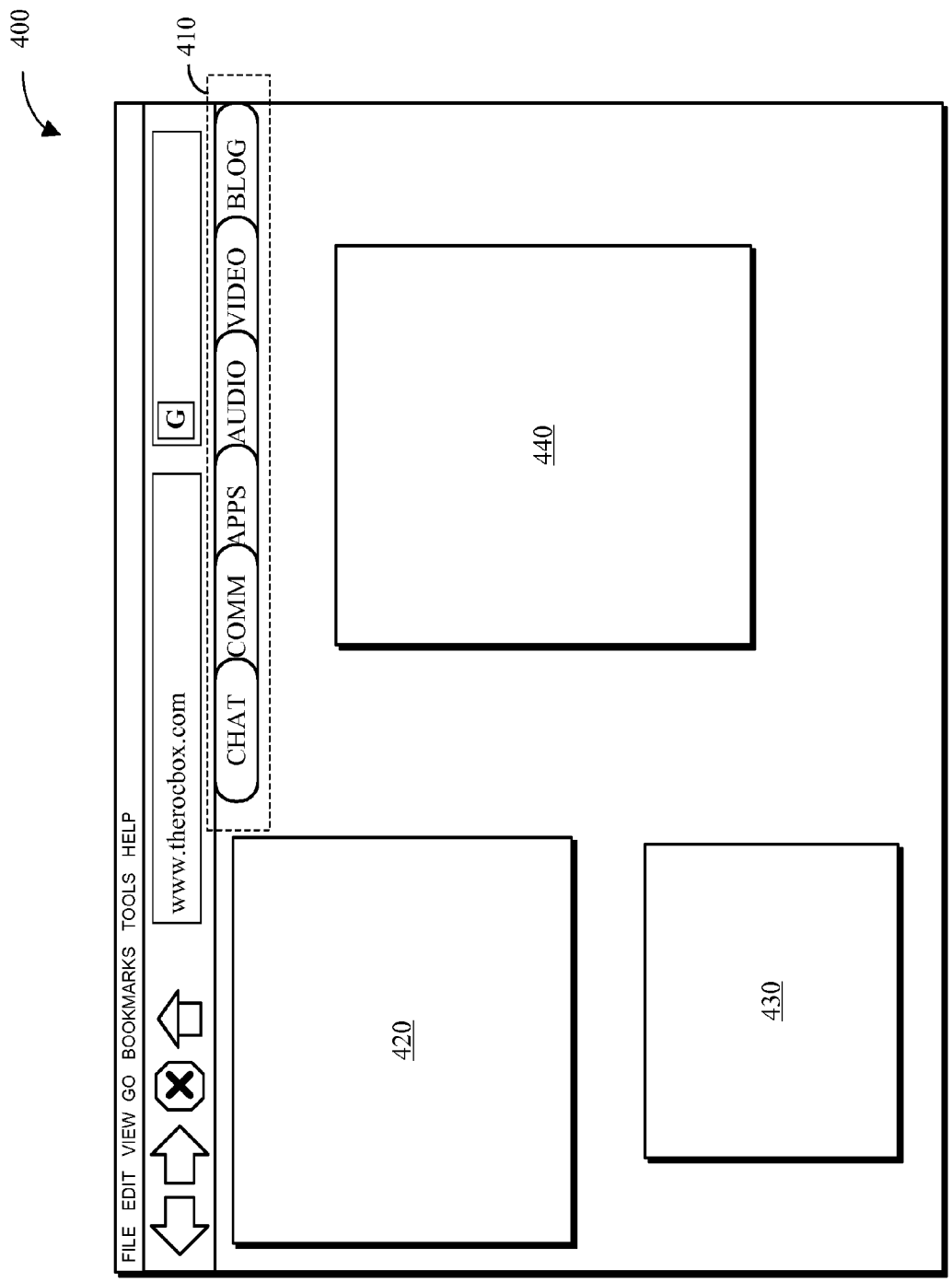
FIG. 4 is a schematic drawing illustrating a web browser interface for accessing a web-based application for implementing a user configurable content interface for accessing various forms of content via the Internet.
Figure 5:
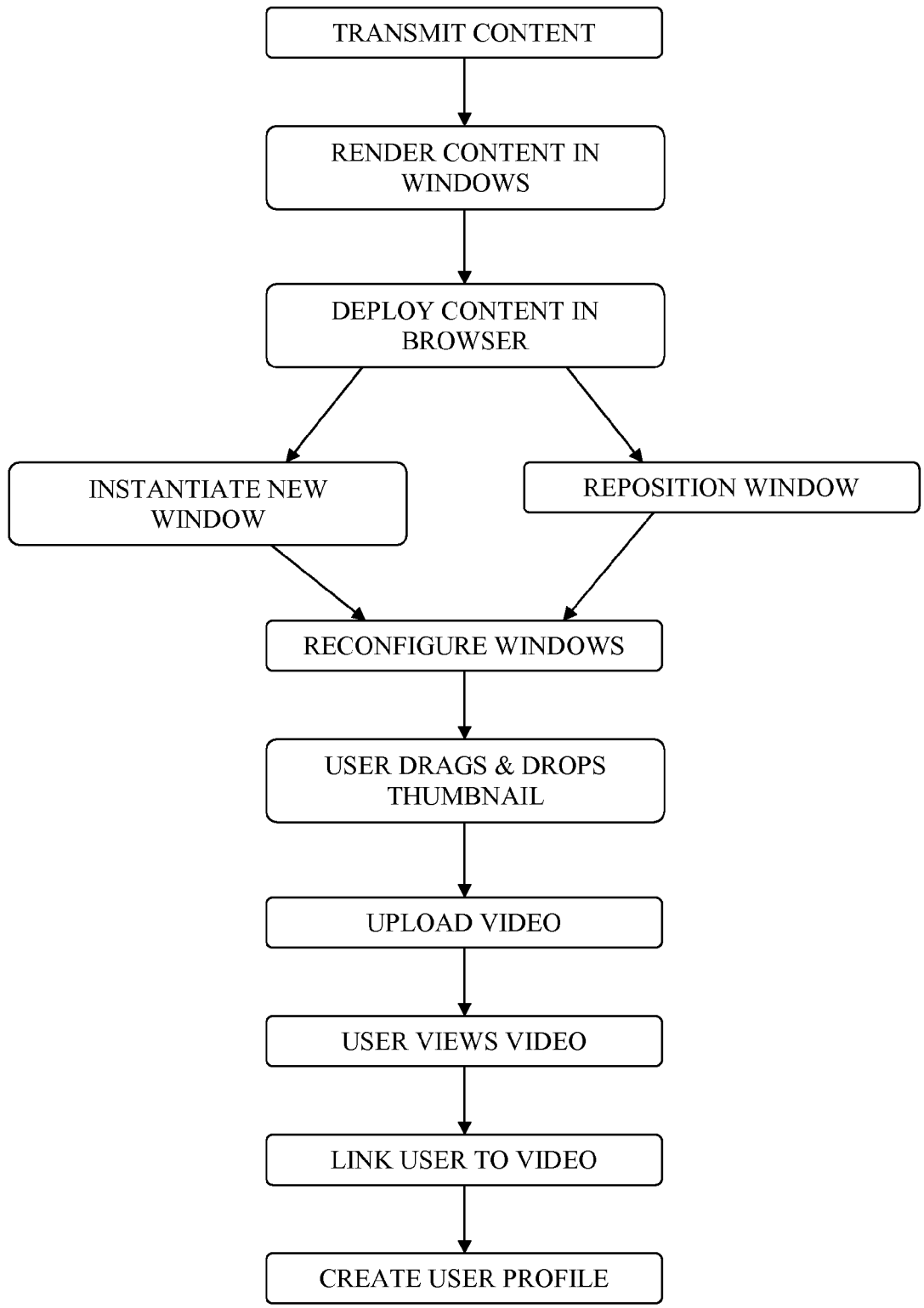
FIG. 5 is a block diagram depicting a method of distributing multimedia content via an integrated user configurable content interface.

Referring now to FIG. 4, a schematic drawing illustrating a web browser-based user interface 400 for accessing various forms of content via the Internet is depicted. As shown in FIG. 4, the user can access the master web site for the Client Side Application 310 and then access Sever Side Application 350, thereby allowing the user to interface with various forms of content via the Internet.

Client Side Application 310 may be configured to display one or more content tabs 410. Each content tab 410 will provide a hyperlink to a specific type of content and the user can click on the tab to activate a window for interacting with that type of content. By was of example and not limitation, there may be a blog tab, a video tab, an audio tab, an application tab, a community tab, a photo tab, and a chat tab. Those skilled in the art will recognize that other forms of content may also be included by including additional content tabs 410.

For example, the user could select the video tab and select a video clip from their video playlist. The selected video clip will then be displayed in window 420 and the user could also select the photo tab to display various digital photos in window 430. Similarly, the user could then select the community tab and the user would be automatically logged into their various social networking applications in window 440. In this fashion, the user can be involved in a "community of communities" and participate in multiple social networking opportunities from within the single window of Client Side Application 310. It is important to note that regardless of which content tabs 410 are selected by the user, all of the other windows will remain "active."

When the "communities" tab is selected by the user, it will be possible for the user to interact with other users through various social networking sites. This is accomplished by the user initially "pre-loading" or entering the user's information for one or more social networking sites into the user's profile for the master web site. Once the social networking account information for the user has been stored, then anytime the user logs into the master website, all of their accounts for the various social networking sites will be activated. This will allow the user to watch various forms of content such as videos, etc. while interacting with other users. Each user can participate with the other users through third party social networking applications while also interacting with other software applications and share media such as video and audio content as well as "chat" and "instant messaging."

The system may be configured so as to permit users to use Client Side Application 310, as embodied in user interface 400 of FIG. 4, to access Database 223 of FIG. 2 and upload and download content, communicate with other users, post and review blogs, etc.

Client Side Application 310 may be configured to support a "browser in browser" configuration. In this configuration, a video window will be displayed within the browser window in Client Side Application 310 and other browser windows may also be displayed simultaneously within the same browser window. While previously known browser applications may be configured to display a video window in conjunction with a web browser, these previously known browsers will generally disable any video playback once another window in the browser window is selected by the user.

In contrast with this approach, certain embodiments use the functionality provided by Video Mechanism 351 of FIG. 3 to maintain the video playback, even when the user selects an alternative window within the current browser window. This is in contrast to most web browsers that reload the browser page whenever the user selects a different window, thereby terminating video playback of any video clip. In this fashion, the user may continuously watch a video clip while simultaneously interacting with the other functions provided by Client Side Application 310 such as blogging, chatting, performing word processing functions, etc.

In addition to the various functions previously described, a drag and drop video functionality is contemplated for the users of Client Side Application 310. With the drag and drop video functionality, a thumbnail of any video clip can be dragged into a video player playlist, making the video clip available for viewing by the user of Client Side Application 310. In this fashion, any video clip can be accessed and viewed by the user of Client Side Application 310. It is anticipated that multiple video clips, represented by one or more "thumbnails," will be available at various locations on the Internet and may be viewed using Video Mechanism 351 of FIG. 3. Once the video clip is dragged to the video playlist by the user, the actual video upload will be managed and maintained by Content Upload/Download Mechanism 354 as a background function without any user intervention, thereby making the transfer of the content transparent to the user of Client Side Application 310.

In addition to the various functions previously described, whenever a user uploads any content using Content Upload/Download Mechanism 354 and Client Side Application 310 of FIG. 3, the user profile for the user that uploaded the content is referenced with and linked to the uploaded content. In this fashion, it will be possible for the user of Client Side Application 310 to identify which user uploaded any specific content. By clicking on any content item, such as a video clip, the user profile for the user that uploaded the content will be displayed by Client Side Application 310. In addition to providing information about the user that uploaded the content, it will be possible to access the user profile and then link to any other content uploaded by that user. This is in contrast to most presently known applications that allow for "anonymous" upload of content. While this approach may be useful for certain applications, it may also encourage users to upload content in violation of copyright and other laws. Accordingly, by connecting all of the uploaded content to the specific user that uploaded the content, the user and all of the content associated with that user may be quickly identified and, if necessary, deleted.

As previously explained, a user of Client Side Application 310 will be provided with the ability to watch video clips, listen to audio clips, interact and communicate with other users, access basic application software, and perform other functions simultaneously. This level of functionality is not known in typical web browsers and web browser applications.

Additionally, app tab 410 invokes common application software functionality such as word processing; spreadsheet, graphics, etc. The app tab 410 can be configured to launch any standard application software including Microsoft Office as well as Open Office application software as well. In this fashion, the user can utilize application software while simultaneously chatting, blogging, watching videos, listening to audio content, etc.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A method of distributing multimedia content via an integrated user configurable content interface, comprising:
    transmitting a plurality of multimedia content via a network;
    rendering the plurality of multimedia content within a plurality of corresponding content windows;
    deploying the plurality of content windows within a content management application, wherein the content management application provides a user interface that allows a user to manage the plurality of content windows and access the plurality of multimedia content; and
    automatically configuring the plurality of content windows, wherein the configuration is based upon user preferences, the total number of content windows, and the type of content requested.

2. The method of claim 1, wherein at least two of the plurality of multimedia content operate simultaneously.

3. The method of claim 1, further comprising:
    instantiating a new content window in response to a user request of multimedia content; and,
    automatically repositioning the new content window and reconfiguring the plurality of content windows based upon user preferences, the total number of content windows, and the type of content requested.

4. The method of claim 1, further comprising:
    repositioning at least one of the plurality of content windows in response to a user request; and,
    reconfiguring the plurality of content windows, wherein the configuration is automatically performed based upon user preferences, the total number of content windows, and the type of content requested.

5. The method of claim 1, wherein the network is an internet network.

6. The method of claim 1, wherein the plurality of content windows are browser windows, wherein the content management application is a main browser window, and the wherein the user interface comprises of at least one content browser window within the main browser window.

7. The method of claim 6, wherein the user interface provides for a means of controlling the functionality of the content browser windows.

8. The method of claim 6, wherein at least one of the content browser windows is a video player, and wherein the video player maintains a video playback while the user simultaneously interfaces with at least one other content browser window within the main browser window.

9. The method of claim 8, further comprising:
    uploading a video via the network upon the user dragging and dropping a thumbnail of the corresponding video into a playlist for the video player; and,
    making the video available for viewing in the video player.

10. The method of claim 9, further comprising:
    linking the user to the uploaded video.

11. The method of claim 10, further comprising:
    creating a profile of the user, wherein the profile includes links to previously uploaded multimedia content uploaded by the user.

12. A method of distributing multimedia content via an integrated user configurable content interface, comprising:
    transmitting a plurality of multimedia content via a network;
    rendering the plurality of multimedia content within a plurality of corresponding content windows; and,
    deploying the plurality of content windows within a content management application, wherein the content management application provides a user interface that allows a user to manage the plurality of content windows and access the plurality of multimedia content while automatically configuring the plurality of content windows based upon user preferences, the total number of content windows, and the type of content requested;
    wherein at least two of the plurality of multimedia content operate simultaneously, and
    wherein the user interface operates a first multimedia content in a corresponding first content window while the user simultaneously interfaces with at least one other multimedia content within at least one other corresponding content window.

13. The method of claim 12, wherein the first multimedia content is a video playback, wherein the corresponding first content window is a video player, and wherein the video player maintains the video playback while the user simultaneously interfaces with at least one other multimedia content within at least one other corresponding content window.

14. A system for distributing multimedia content via a particular machine having an integrated user configurable content interface, comprising:
    a plurality of multimedia content transmitted via a network;
    a user interface accessible to the network that renders the plurality of multimedia content within a plurality of corresponding content windows; and,
    a content management application that deploys the plurality of content windows, wherein the user interface renders the plurality of content windows within the content management application to provide for a browser in browser configuration that allows a user to manage the plurality of content windows and access the plurality of multimedia content, wherein the content management application automatically configures the plurality of content windows based upon user preferences, the total number of content windows and the type of content requested.

15. The system of claim 14, wherein at least two of the plurality of multimedia content operate simultaneously.

16. The system of claim 14, further comprising:
a new content window instantiated in response to a user request of multimedia content, wherein the content management application automatically repositions and reconfigures the new content window and the plurality of content windows based upon user preferences, the total number of content windows, and the type of content requested.

17. The system of claim 14, further comprising:
at least one of the plurality of content windows repositioned in response to a user request, wherein the content management application automatically reconfigures and repositions the plurality of content windows based upon user preferences, the total number of content windows, and the type of content requested.

18. The system of claim 14, wherein the network is an internet network.

19. The system of claim 14, wherein the plurality of content windows are browser windows, wherein the content management application is a main browser window, and wherein the user interface comprises of at least one content browser window within the main browser window.

20. The system of claim 19, wherein the user interface provides for a means of controlling the functionality of the content browser windows.

21. The system of claim 19, wherein at least one of the content browser windows is a video player, and wherein the video player maintains a video playback while the user simultaneously interfaces with at least one other content browser window within the main browser window.

22. The system of claim 21, further comprising:
a video uploaded via the network upon the user dragging and dropping a thumbnail of the corresponding video into a playlist for the video player, wherein the content management application makes the video available for viewing in the video player.

23. The system of claim 22, further comprising:
a profile of the user linked to the uploaded video, wherein the profile includes links to previously uploaded multimedia content uploaded by the user.

24. A system for distributing multimedia content via a particular machine having an integrated user configurable content interface, comprising:
a plurality of multimedia content transmitted via a network;
a user interface accessible to the network that renders the plurality of multimedia content within a plurality of corresponding content windows; and,
a content management application that deploys the plurality of content windows, wherein the content management application automatically configures the plurality of content windows based upon user preferences, the total number of content windows, and the type of content requested;
wherein the user interface renders the plurality of content windows within the content management application to provide for a browser in browser configuration that allows a user to manage the plurality of content windows and access the plurality of multimedia content,
wherein at least two of the plurality of multimedia content operate simultaneously, and
wherein the user interface operates a first multimedia content in a corresponding first content window while the user simultaneously interfaces with at least one other multimedia content within a least one other corresponding content window.

25. The system of claim 24, wherein the first multimedia content is a video playback, wherein the corresponding first content window is a video player, and wherein the video player maintains the video playback while the user simultaneously interfaces with at least one other multimedia content within at least one other corresponding content window.

26. A non-transitory computer-readable storage medium tangibly storing thereon computer-executable instructions for a method comprising:
displaying a user interface for distributing multimedia content via a continuously playing video player, the continuously playing player further comprising:
a video player configured to appear within a first web page when a user browses to the first web page and to render video overlaid on the first web page, the player being configured to play the same video stream continuously while a user browses from the first web page to a second web page; and
automatically displaying and configuring a plurality of content windows based upon user preferences, the total number of content windows, and the type of content requested.

* * * * *